May 12, 1953        J. MORKOSKI        2,637,963
BEET HARVESTER

Filed June 24, 1950        2 Sheets-Sheet 1

INVENTOR
JAMES MORKOSKI
ATT'Y

Patented May 12, 1953

2,637,963

UNITED STATES PATENT OFFICE 2,637,963

BEET HARVESTER

James Morkoski, Memphis, Tenn., assignor to International Harvester Company, a corporation of New Jersey Application June 24, 1950, Serial No. 170,080

6 Claims. (Cl. 55—106)

This invention relates to agricultural implements and particularly to a harvester for beets and the like. More specifically, the invention concerns improved mechanism for removing beets from the soil and delivering them to a receptacle substantially free of adhering dirt and other foreign matter.

In the harvesting of sugar beets it has been found in the past with conventional harvesting machinery that the loads delivered to the processing plants included a high percentage by weight of dirt and trash removed by the digging mechanism in the harvesting operation, and an important object of the present invention is the provision of improved machinery for harvesting sugar beets and the like providing maximum removal of dirt and trash and the delivery of clean beets to receptacles for transport to the processing plants.

Another object of the invention is the provision in a beet harvester of improved mechanism for lifting the beets from the soil and advancing them to an elevator for delivery to a receptacle.

Customarily, beets are dug as a continuous procedure by a pair of laterally spaced shovels mounted on a traveling vehicle. These shovels penetrate the soil, loosen the beets and lift them from the ground as the vehicle traverses a crop row. The beets move rearwardly and upwardly along the shovel blades and are picked up by an elevating conveyor. Dirt and trash adhering to the beets when dug accompany them to the elevator and remain with them when delivered to the receptacle. Furthermore, the passage of the beets from the shovels to the elevator is slow and uncertain and a rather high percentage of beets fall to the ground. A further object of this invention, therefore, is to provide improved means for advancing the beets from the digger blades to the elevator.

Figure 1:
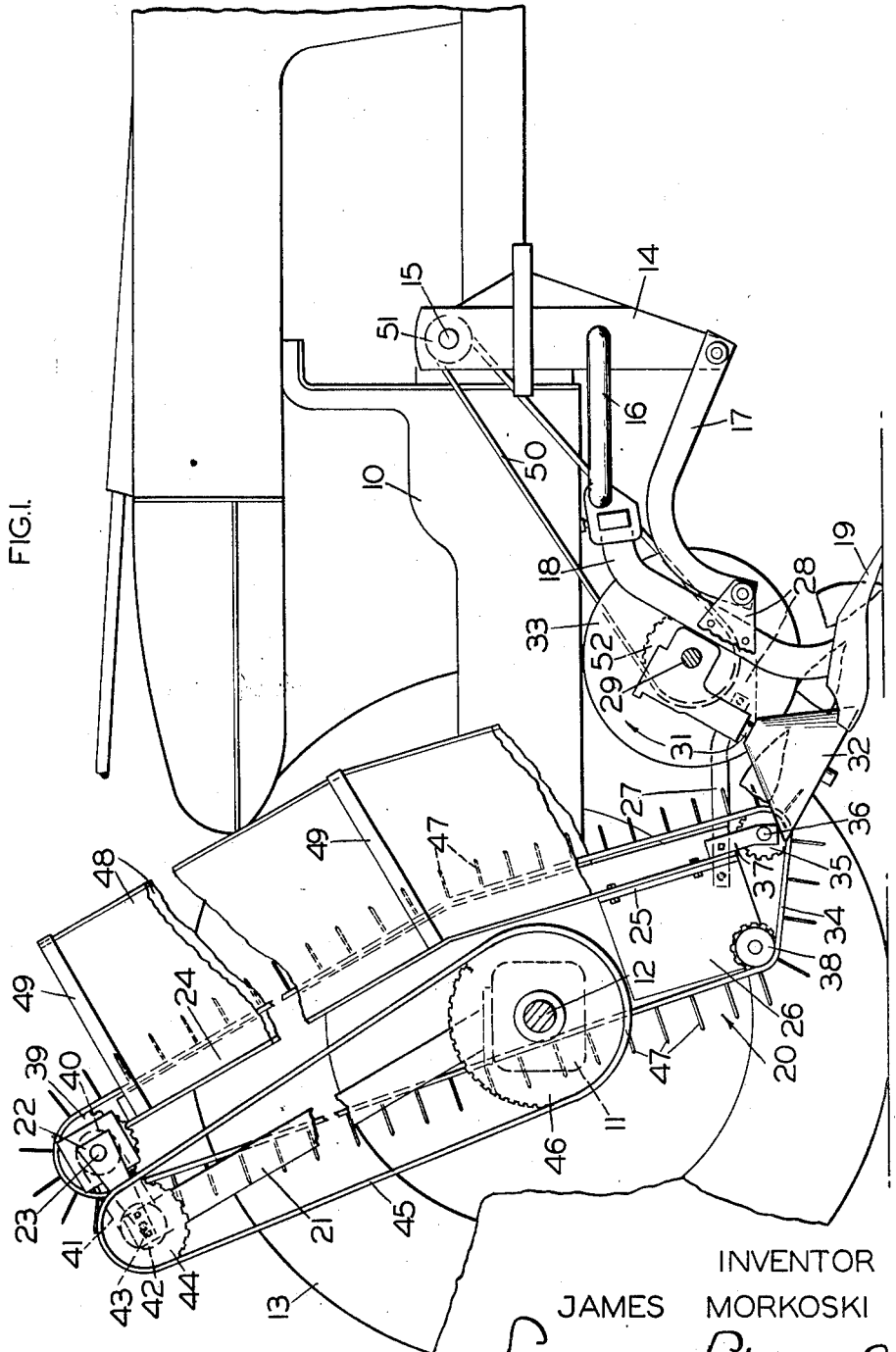
Figure 2:
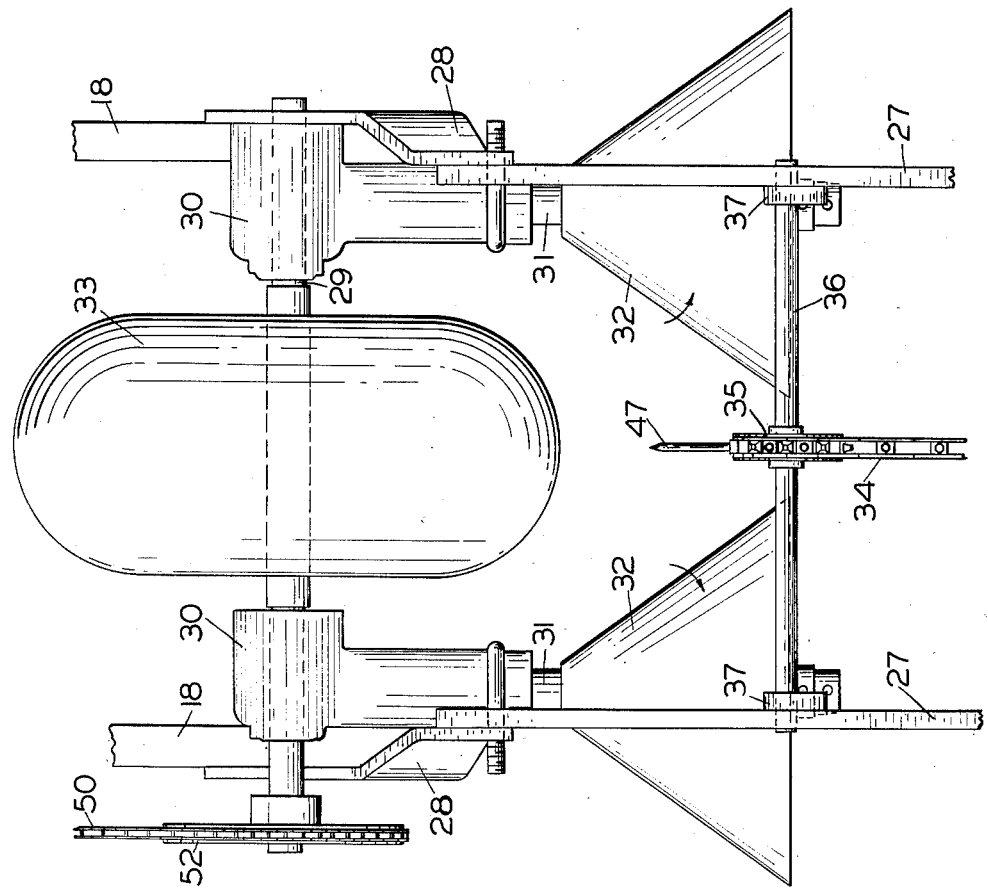

Other objects and advantages of the invention will become clear from the following detailed description when read in conjunction with the accompanying drawings, wherein:

Figure 1 is a side elevational view partly in section of the rear portion of a tractor, with parts broken away for clarity, upon which is mounted harvesting machinery embodying the features of the present invention, and Figure 2 is an enlarged detail view from the rear of the forwarding and cleaning mechanism shown in Figure 1.

Referring now to the drawings, the numeral 10 designates the body of a tractor having a rear axle housing 11, an axle 12 and drive wheels 13, only one of which is shown. Secured to and depending from the tractor body is a bracket 14, the upper end of which is apertured to rotatably receive one end of a power take-off shaft 15, and upon the lower portion of which are pivoted vertically spaced links 16 and 17, link 16 being in the form of a bail. The rear ends of these links support laterally spaced tool standards 18 upon the lower ends of which are mounted laterally spaced shovels 19. As the machine traverses the field the shovels 19 penetrate the ground and dislodge the beets. The shovels extend rearwardly and upwardly and the beets pass rearwardly and upwardly therebetween toward the elevator 20, which is supported upon a bracket 21 affixed at its base to the axle housing 11 of the tractor.

At the upper end of bracket 21 and extending forwardly therefrom is a plate 22 carrying at its forward end a spindle 23 which is further supported on the upper end of an eye beam 24, the flanged lower end of which is secured to the flange 25 of a bracket 26 affixed to the axle housing 11. A connection is made between the bracket 26 and the standards 18 by one or more straps 27 pivotally connected to the bracket 26 and to one of a pair of plates 28 affixed to the standards and extending rearwardly therefrom. This pivotal connection accommodates vertical movement of the standards 18 relative to conveyor 20.

Plates 28 support the ends of a transverse axle or shaft 29 drivingly connected by suitable conventional gearing, not shown, in housings 30 with a pair of laterally spaced shafts 31, upon the lower ends of which are mounted the conically shaped rollers 32, which are driven from shaft 29 in opposite directions as indicated by the arrows in Figure 2. A wheel 33 having a flexible peripheral surface, and preferably in the form of a low pressure pneumatic tire, is mounted on shaft 29 to be driven thereby in the direction of the arrow in Figure 1. This wheel is mounted centrally between the standards 18 and above the shovels 19 and extends downwardly between the upper portions of the rollers 32, as indicated in the drawings, in a position to engage the beets as they are lifted by the blades 19, urging the beets rearwardly and confining them between the rollers 32, at the same time cleaning a great deal of dirt and trash from the beets. The engagement of the beets by the rotating wheel 33 and rollers 32 thus moves them rearwardly toward the elevating conveyor 20.

Conveyor 20 comprises a narrow endless chain 34, the lower reach of which is trained around a sprocket wheel 35 mounted on a shaft 36 supported upon bars 37 secured to straps 27. An idler roller 38 carried by bracket 26 also engages the lower portion of chain 34 and the upper end of the chain rides on a sprocket wheel 39 mounted on shaft 23. The chain 34 is driven by a sprocket wheel 40 also mounted on shaft 23 and drivingly connected by a chain 41 with a sprocket 42 mounted on a shaft 43 at the upper end of bracket 21.

Also mounted on shaft 43 is a sprocket wheel 44 connected by a drive chain 45 with a sprocket wheel 46 mounted on the tractor drive shaft 12.

The upper flanged edge of beam 24 serves as a track for chain 34, the lower portion of which on sprocket wheel 35 extends forwardly between the rear portions of conical rollers 32. Chain 34 has secured thereto at spaced intervals a series of spikes 47, which project forwardly between the rollers 32 and impale the beets delivered thereto by the rollers and wheel 33, as indicated in Figure 1. Dirt and trash removed from the beets by the action of rollers 32 and wheel 33 falls to the ground, and foreign matter still adhering to the beets as they are impaled on the conveyor spikes drops off and falls to the ground as the beets are elevated. After the beets are carried to the upper end of the elevator they fall from the spikes or are dislodged therefrom by suitable stripping means, not shown, and are received in a receptacle, also not shown, with the inclusion in the load of a minimum of foreign matter. The beets are guided in their passage upwardly on the elevator 20 and incompletely speared beets prevented from falling off the spikes by a pair of spaced side curtains 48 supported on standards 49 secured to the beam 24. It may be noted that the foliage of the beets delivered to the elevator 20 has previously been removed by suitable topping mechanism not shown in the drawings.

Wheel 33 and rollers 32 are driven from a common source, the power take-off shaft 15, deriving its power from the tractor power plant, by a drive chain 50 trained around a sprocket wheel 51 on drive shaft 15 and a sprocket wheel 52 mounted on axle 29.

From the foregoing description, which applicant believes explains the operation of the beet harvesting mechanism of the present invention, it should be clear that applicant has provided novel and efficient mechanism for harvesting beets and the like and delivering them to a wagon or other receptacle with a minimum of dirt and trash. While the invention has been described in its preferred embodiment, it should be understood that modifications may be made therein without departing from the spirit of the invention or the scope of the appended claims.

What is claimed is:

1. In a power operated traveling beet harvester, the combination with a pair of laterally spaced digger blades for lifting the beets from the soil, of a pair of laterally spaced conical rollers arranged rearwardly of the digger blades to receive therebetween the beets lifted by the digger blades and rotatably mounted on rearwardly inclined axes, means for driving the rollers in opposite directions to move the beets rearwardly, a conveyor extending upwardly and having its lower portion arranged between the rollers, spikes mounted on the conveyor to impale the beets as they are delivered thereto by the rollers, a wheel having a flexible tire rotatably mounted above and between the conical rollers and the digger blades in a position to engage the beets as they are lifted and delivered to the rollers, and means for driving the wheel in a direction to urge the beets toward the conveyor.

2. In a power operated traveling beet harvester, the combination with a pair of laterally spaced digger blades for lifting the beets from the soil, of a pair of laterally spaced conical rollers arranged rearwardly of the digger blades to receive therebetween the beets lifted by the digger blades and rotatably mounted on rearwardly inclined axes, means for driving the rollers in opposite directions to move the beets rearwardly, a conveyor extending upwardly and having its lower portion arranged between the rollers, spikes mounted on the conveyor projecting between the rollers in a position to impale the beets as they are delivered thereto by the rollers, a rotary member mounted above and between the conical rollers arranged to engage the beets as they are delivered thereto by the digger blades and to confine them between the rollers, and means for driving the rotary member in a direction to urge the beets toward the spiked conveyor.

3. In a power operated traveling beet harvester, the combination with means for lifting the beets from the soil, of a pair of laterally spaced downwardly and rearwardly extending rollers arranged to receive therebetween the beets removed from the soil by the lifting means and to move them rearwardly, a conveyor having its receiving end disposed between the rollers at the rear thereof, a transverse driven axle mounted above the lifting means and the rollers, a rotary member mounted on the axle and driven thereby, said rotary member having a continuous peripheral surface and being disposed between the rollers in a position to engage and confine the beets between the rollers and urge them toward the conveyor, and means for driving the rollers from said axle.

4. In a power operated traveling beet harvester, the combination with means for lifting the beets from the soil, of a pair of laterally spaced downwardly and rearwardly extending rollers arranged rearwardly of the lifting means to receive therebetween the beets removed from the soil by the lifting means and to move them rearwardly, a conveyor having its receiving end disposed between the rollers at the rear thereof, a rotary member mounted above the lifting means and between the rollers in a position to engage and confine the beets removed from the soil by the lifting means, and means for driving the rotary member in a direction to urge the beets through the rollers toward the conveyor, said conveyor comprising driven sprocket wheels, an endless chain trained around said sprocket wheels, and spikes mounted on said chain and extending forwardly between said rollers in a position to impale the beets delivered thereto by the rollers and the rotary member.

5. In a power operated traveling beet harvester, the combination with a pair of laterally spaced earth penetrating digger blades for lifting the beets from the soil and standards supporting the blades, of a transverse axle carried by the standards, means for driving the axle, a wheel having a yielding contact surface revolubly mounted on the axle between the digger blades and engageable with the beets lifted by the blades to urge them rearwardly, a pair of laterally spaced downwardly and rearwardly extending shafts on opposite sides of said wheel operatively connected to said axle to be driven therefrom, a pair of conical rollers mounted on said shafts to receive therebetween the beets removed rearwardly by the wheel, and an endless driven conveyor arranged rearwardly of the rollers and having spikes thereon extending forwardly between the rollers to impale the beets delivered thereto by the rollers and the wheel.

6. In a power operated traveling beet harvester, the combination with a pair of laterally spaced earth penetrating digger blades for lifting the beets from the soil, and standards supporting the blades, of a transverse axle carried by the standards, means for driving the axle, a wheel having a yielding contact surface revolubly mounted on the axle between the digger blades and engageable with the beets lifted by the blades to urge them rearwardly, a pair of laterally spaced downwardly and rearwardly extending shafts on opposite sides of said wheel operatively connected to said axle to be driven therefrom, a pair of conical rollers mounted on said shafts to receive therebetween the beets moved rearwardly by the wheel, an endless driven conveyor arranged rearwardly of the rollers and therebetween, said conveyor comprising a narrow chain having a single row of spikes projecting therefrom between the rollers to impale the beets delivered thereto by the rollers.

JAMES MORKOSKI.

References Cited in the file of this patent

UNITED STATES PATENTS

| Number | Name | Date |
| --- | --- | --- |
| 910,467 | Fox | Jan. 19, 1909 |
| 919,342 | Gettelman | Apr. 27, 1909 |
| 1,199,696 | Hawley et al. | Sept. 26, 1916 |
| 2,337,698 | Walz | Dec. 28, 1943 |
| 2,337,699 | Walz | Dec. 28, 1943 |
| 2,428,904 | Zuckerman | Oct. 14, 1947 |
| 2,463,447 | Walz et al. | Mar. 1, 1949 |
| 2,595,340 | Diethelm | May 6, 1952 |